United States Patent [19]

Pfau et al.

[11] 4,135,070

[45] Jan. 16, 1979

[54] EDM APPARATUS AND PROCESS WITH CONTROL FOR VARIABLE ECCENTRIC OVERCUTTING

[75] Inventors: Jean Pfau; Alain Wavre, both of Geneva; Rudolf Schneider, Reinach, all of Switzerland

[73] Assignee: Ateliers des Charmilles, S.A., Geneva, Switzerland

[21] Appl. No.: 787,850

[22] Filed: Apr. 15, 1977

[30] Foreign Application Priority Data

May 5, 1976 [CH] Switzerland .................. 5614/76

[51] Int. Cl.² .............................................. B23P 1/08
[52] U.S. Cl. ............................... 219/69 M; 219/69 G; 219/69 V
[58] Field of Search ............... 219/69 M, 69 V, 69 G, 219/69 E, 69 R, 69 C

[56] References Cited

U.S. PATENT DOCUMENTS

| | | | |
|---|---|---|---|
| Re. 26,970 | 10/1970 | Bentley et al. ..................... | 219/69 V |
| 2,773,968 | 12/1956 | Mantellotti et al. ............... | 219/69 V |
| 3,539,754 | 11/1970 | Furze et al. ......................... | 219/69 V |
| 4,041,268 | 8/1977 | Braudeau et al. ................. | 219/69 M |
| 4,049,942 | 9/1977 | Balleys et al. ...................... | 219/69 M |
| 4,057,703 | 11/1977 | Pfau .................................... | 219/69 V |

*Primary Examiner*—Bruce A. Reynolds
*Attorney, Agent, or Firm*—Hauke and Patalidis

[57] ABSTRACT

The present invention is an EDM (Electrical discharge machining) process and apparatus for machining an electrode workpiece by means of an electrode tool wherein the electrodes are displaced relative to each other along a principal feed axis while, simultaneously, the electrodes are displaced relative to each other along an orbital path in a plane perpendicular to the principal feed axis, such as to produce between the electrodes a three-dimensional translation motion, and for providing between the electrodes an average machining gap wider than the gap width sustaining electrical discharges. The invention provides a control of the amplitude of the relative translation motion of the electrodes while displacing the direction of said motion as soon as a predetermined orbiting path limit is reached such as to allow a rapid increase of the gap between the electrodes when the electrode tool is retracted.

27 Claims, 5 Drawing Figures

EDM APPARATUS AND PROCESS WITH CONTROL FOR VARIABLE ECCENTRIC OVERCUTTING

BACKGROUND OF THE INVENTION

It is known to machine an electrode workpiece by an electrode tool, in EDM processes and apparatus, by feeding the electrode tool and the electrode workpiece relative to each other along a principal feed axis causing a penetration of the electrode tool into the workpiece to form a cavity while simultaneously orbiting the electrodes relative to each other along a pair of orthogonal axes disposed in a plane perpendicular to the principal feed axis, such as to overcut the electrode workpiece or, in other words, cut in the workpiece a cavity of a larger width than could be achieved by relative feed of the electrodes along the principal axis only, without relative orbiting motion of the electrodes. It is also known to vary the amplitude of the relative translation or orbiting motion as a function of the position of the electrode tool relative to the electrode workpiece along the principal feed axis, as disclosed in U.S. Pat. No. 3,539,754, to provide the workpiece with a cavity of a predetermined conicity relative to the lateral surface of the cavity. The amplitude of lateral translation of the electrode tool relative to the workpiece, or orbital motion, is progressively changed as a function of the amount of penetration of the electrode tool within the workpiece.

In the known EDM processes, the trace of trajectory of the electrode orbiting path is disposed along a conical surface of revolution inclined relative to the principal feed axis at the same angle as the surface machined in the workpiece and, when unfavorable machining conditions occur, a servo control causes the electrode tool to retract from within the cavity in the workpiece, the retraction of the electrode tool being effected along the conical surface. As a result, the machining gap width is increased only very slowly, which prevents eliminating abnormal machining conditions.

The present invention has for principal object to provide machining in a workpiece a cavity having a predetermined shape, while still permitting a rapid increase of the machining gap width when the electrode tool is retracted and sinking a relatively deep cavity in the workpiece, if so required.

SUMMARY OF THE INVENTION

To that effect, the process according to the present invention is characterized by the machining of the workpiece being effected in several consecutive passes, with the electrode orbiting path being changed at every pass along a surface of revolution of a predetermined shape until the orbiting path reaches a predetermined limit, with the result that the machined surface has an orientation which is different from that of the envelope of all the orbiting path limits.

In this manner, EDM machining of the workpiece can progress in any direction as, for example, in a longitudinal, radial, angular or circular direction, which is defined by the shape of the envelope of the orbiting path limits, while still allowing the electrode tool to be retracted along a predetermined angular path, when it is necessary to rapidly retract the electrode tool, in the event of a short circuit for example. The advantages procurred by the present invention are of particular interest during machining of a surface substantially parallel to the longitudinal axis of the electrode tool, or during machining of a surface substantially perpendicular to that axis.

In addition, the present invention permits to provide a saw tooth feed of the electrode tool, which improves the rate of circulation of the dielectric fluid in the machining zone space.

The present invention further contemplates an arrangement of elements for practicing the process of the invention.

The many objects and advantages of the invention will become apparent to those skilled in the art when the following description of the best modes contemplated for practicing the invention is read in conjunction with the accompanying drawing wherein:

DETAILED DESCRIPTION OF THE PREFERRED EMBODIMENT

Figure 1:
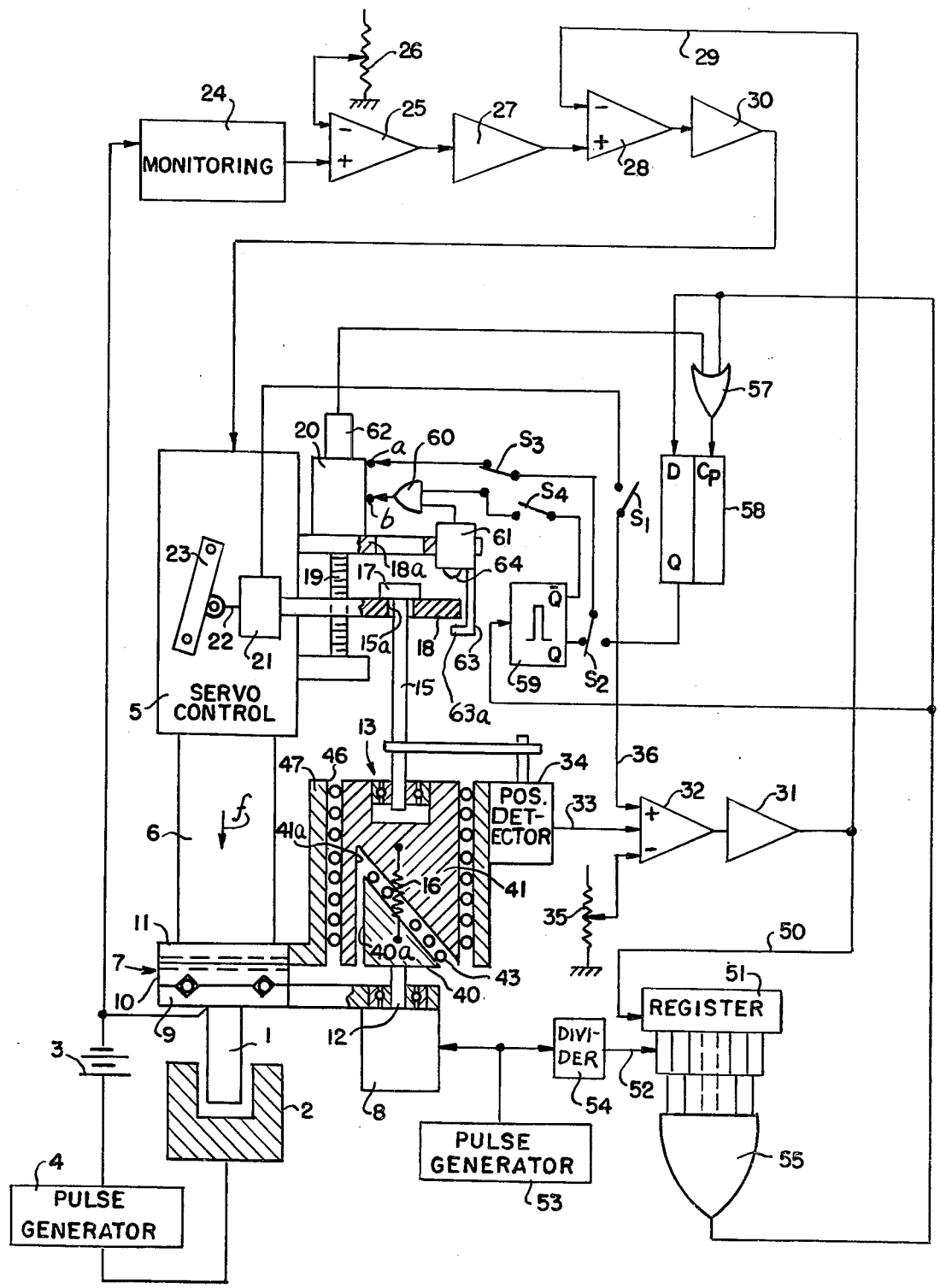
FIG. 1 is a schematic block diagram of an example of combination of elements according to the present invention.

With reference to FIG. 1 of the drawing, an arrangement of elements according to the present invention comprises an electrode tool 1 for machining a cavity in an electrode workpiece 3 through a pulse generator 4.

The electrode tool 1 is displaced towards the workpiece 2, as shown by arrow f, by a conventional servo control system having a stationary housing 5 from which reciprocates a ram 6. The electrode tool 1 is mounted on the end of the ram 6 by means of a two-axis table 7 with ways disposed at right angles. The table 7 is capable of displacing the electrode tool 1 transversely relative to its longitudinal axis, that is along a plane perpendicular to the electrode tool longitudinal axis direction of feed f.

The lateral displacement of the electrode tool 1 is effected by means of an electric motor 8 mounted below the bottom plate 9 of the table 7 by which the electrode tool 1 is directly held. The plate 9 is movable along an axis relative to a slide 10 of the table 7, the slide 10 of the table being moveable, along a second axis at a right angle to the first axis, relative to a saddle 11 affixed to the end of the ram 6. The motor 8 drives through its output shaft 12 an orbiting mechanism 13 of controllably variable eccentricity.

The orbiting mechanism 13 consists of two wedge members 40 and 41 pulled toward each other by a spring 16. The wedge member 40 has an upper surface inclined at 45° relative to the axis of rotation of the motor shaft 12 which drives the wedge member 40 in rotation. The second wedge member 41 has an inclined surface mating the inclined surface of the wedge member 40, a linear ball bearing 43 being interposed between the inclined surfaces. The wedge member 41 is rotatably supported by, and is linearly displaceable axially in, a bore 46 disposed in a housing 47 mounted on the side of the table saddle 11. The axial position of the wedge member 41 is determined by the axial position of a rod 15. It is readily apparent that a longitudinal displacement of the rod 15 causes a longitudinal displacement of the wedge member 41 within the bore 46 and, consequently, a lateral displacement of the wedge member 40 which causes in turn an eccentric displacement, laterally, of the motor shaft 12 relative to the axis of the rod 15. Consequently, when the output shaft 12 of the motor 8 is rotated, the motor 8 and its shaft 12 are caused to be eccentrically displaced which in turn causes the electrode tool holding plate 9 to be orbited, with an eccentricity which is adjustable relative to the longitudinal axis of the rod 15.

In order to provide a means for adjusting the eccentricity of the orbiting mechanism 13, the rod 15 is disposed through an aperture 15a through a slide 18 and is provided at its top end with an abutment 17 adapted to engage the top of the slide 18. The slide 18 is movable vertically by means of a jackscrew 19 driven by an electric motor 20 mounted on a stationary bracket 18a. The slide 18 supports a position detector of transducer 21 supplying an electrical signal representative of the position of the slide 18 by means of a feeler 22 engaged with the side of a cam plate 23 having a cam angle adjustable in order to influence some of the displacement parameters of the electrode tool 1. The electrode tool 1 is connected to a monitoring circuit 24, such that the electrode tool voltage is applied to the input of the monitoring circuit 24 which supplies at its output an electrical signal of an amplitude representing the machining gap between the electrode tool 1 and the electrode workpiece 2. The signal at the output of the monitoring circuit 24 is applied to the input of a comparator 25, and a reference voltage, obtained from a potentiometer 26, which is representative of the machining gap width as preset by the machine operator is applied to the other input of the comparator 25.

The signal at the output of the comparator 25 is applied, after amplification through an amplifier 27, to an input of a second comparator 28, the other input of which receives, through a line 29, a signal representative of the axial position of the rod 15 by way of the circuits described hereinafter.

The signal at the output of the comparator 28 is applied, after amplification in an amplifier 30, to the servo control 5.

The signal on the line 29 is representative of the amount of eccentricity of the orbiting motion imposed upon the electrode tool 1 by the orbiting mechanism 13. For that purpose, a position detector 34 responsive to the axial position of the rod 15 and wedge member 41 supplies an analog electrical signal as a function of the amount of eccentricity of the wedge member 40 relative to the axis of revolution of the wedge member 41. That signal is applied, via a line 33, to one of the three inputs of a multiple-input comparator 32.

The second input of the comparator 32 receives a reference voltage from a potentiometer 35 which is representative of the machine operator preset amount of eccentricity or radius of orbital motion. A line 36 is connected to the third input of the comparator 32 and applies to that third input, through a switch $S_1$, the signal at the output of the detector 21 which is representative of the linear position of the slide 18.

The signal at the output of the comparator 32 is applied through an amplifier 31 to the line 29. The signal at the output of the amplifier 31 is also applied, by means of a line 50, to a transfer register 51 which is controlled by transfer pulses applied to an input 52. The transfer pulses are obtained from a pulse generator 53 which also provides pulses to the stepping motor 8. The driving pulses applied to the stepping motor 8 are applied to a divider 54, whose output is connected to the input 52 of the transfer register 51, and which divides the number of pulses from the output of the pulse generator 53 by an appropriate number such that, each time the stepping motor 8 has accomplished a complete orbiting cycle, the number of pulses applied to the input 52 of the transfer register 51 is equal to the number of bits capable of being stored in the transfer register 51.

Therefore, every time the amplitude of the orbiting motion equals a radius defined by the reference signal from the potentiometer 35, the comparator 32 provides an output signal applied to the input of the amplifier 31. The amplified signal is applied, via the line 29, to the comparator 28 to prevent a command signal from being applied to the servo control 5. Such an arrangement is described in detail in application Ser. No. 668,750, now U.S. Pat. No. 4,049,942.

The signal at the output of the amplifier 31 is also applied to the transfer register 51. If the orbiting motion radius, as set by the voltage signal from the potentiometer 35, is achieved uniformly for a full revolution of the stepping motor 8, all the bit positions of the transfer register 51 are occupied such that all of its outputs represent a binary "1." As each output of the transfer register 51 is connected to an input of a multiple-input AND gate 55, a signal appears at the output of the AND gate 55, and that signal is applied simultaneously to an input of an OR gate 57, to the input D of a bistable multivibrator 58 and to the input of a monostable multivibrator 59. A double-pole switch $S_2$ permits to apply either the signal at the output Q of the bistable multivibrator 58, or the signal at the output Q of the monostable multivibrator 59 through a switch $S_3$ to the terminal a of the electrical motor 20 for providing a signal driving the motor in the direction that displaces the slide 18 downwardly. The other output $\overline{Q}$ of the monostable multivibrator 59 is connected through a switch $S_4$ and an AND gate 60 to the terminal b of the motor 20 to drive the motor and the screw jack 19 in the direction that displaces the slide 18 upwardly.

In addition, the arrangement of elements of FIG. 1 provides means for limiting the travel of the slide 18. Those means consist of a limit switch 61 slidably mounted in the stationary bracket 18a supporting the motor 20, provided with a detent 64 which is tripped when the slide 18 reaches its uppermost position. When the slide 18 trips the detent 64, a binary "0" appears at the output of the switch 61 and is applied to an input of the AND gate 60, such that the AND gate blocks any signal at the output Q of the monostable multivibrator 59 from being applied to the terminal b of the motor 20, which signal would cause the slide 18 to be displaced upwardly. The limit switch 61 is also provided with an arm 63 having a finger 63a for engagement with the bottom of the slide 18, such that when the slide 18 reaches a predetermined position, the finger 63a engages the bottom of the slide 18 and pulls the arm 63 and the limit switch 61 downwardly.

The apparatus illustrated at FIG. 1 operates as follows:

During machining, the stepping motor 8 is activated such that the electrode tool 1 is orbited along a circular path in a plane perpendicular to the principal axis of penetration of the electrode tool into the workpiece 2, the radius of the orbiting path being determined by the amount of eccentricity between the motor output shaft 12 and the rod 15. As long as the abutment 17 does not engage the slide 18, the spring 16 pulls the wedge member 41 downwardly such that the lateral surfaces 40a and 41a of the wedge members 40 and 41 are in engagement, in which position the axes of the motor output shaft 12 and of the rod 15 coincide.

The initial position of the slide 18 is set such that it is slightly below the abutment 17 of the rod 15, with the result that the orbiting motion circle is set with a zero radius, causing the electrode tool 1 to feed into the workpiece 2 along its longitudinal axis without any transverse motion relative to that axis. However, as soon as the electrode tool 1 has penetrated into the workpiece 2 to a sufficient depth to cause the abutment 17 of the rod 15 to engage the slide 18, any subsequent feed of the electrode tool 1 within the workpiece 2 causes a relative longitudinal displacement between the rod 15 and the saddle 11 of the table 7, causing in turn a lateral displacement of the wedge member 40 relative to the wedge member 41 and an eccentric displacement between the axis of the rod 15 and the axis of the motor output shaft 12, the eccentricity between the axes increasing progressively linearly as a function of the feed of the electrode tool 1 within the workpiece 2.

In this manner, the electrode tool 1 is subjected to an orbiting translation motion along a path having a radius increasing linearly as a function of the electrode tool feed, such that each point on the surface of the electrode tool is displaced along a conical surface of revolution having an axis parallel to the direction of feed of the electrode tool.

Figures 2, 3:
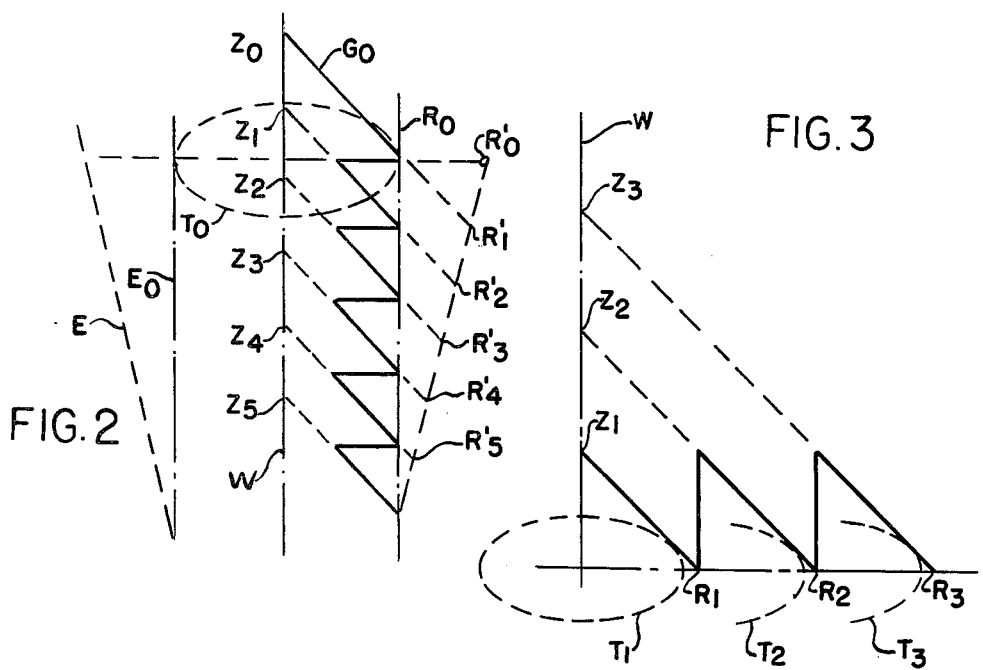
FIGS. 2–5 schematically illustrate diverse examples of relative displacement between an electrode tool and an electrode workpiece obtained by way of the arrangement of FIG. 1.

FIG. 2 is a graphic representation of the axial and radial motion of a given point of the electrode tool 1, with the switches $S_1$ through $S_4$ in the position illustrated at FIG. 1. At the instant when the abutment 17 of the rod 15 engages the slide 18, an arbitrarily chosen point of the electrode tool is at the level $Z_0$ and, as a result of the increase in radius of the orbiting motion, that point is displaced along a cone whose generatrix is represented by line $G_0$. When the eccentricity reaches the value $R_0$ in the course of a complete cycle $T_0$ of translation, the signal supplied by the detector 34, FIG. 1, increases to a value greater than the reference voltage obtained from the potentiometer 35, such that the AND gate 55 supplies at its output a signal which is applied to the input of the monostable multivibrator 59, which in turn provides at its output Q a pulse of a predetermined duration. That pulse is supplied through the switches $S_2$ and $S_3$ to the terminal a of the motor 20 which then drives downwardly the slide 18. The amount of downward displacement of the slide 18 is determined by the duration of the pulse at the output Q of the monostable multivibrator 59 and by the speed of rotation of the output shaft of the motor 20. The downward motion of the slide 18 causes a decrease in the amount of eccentricity between the axis of the rod 15 and the axis of the output shaft 12 of the motor 8, therefore a decrease of the orbiting motion radius, and machining is effected, by the arbitrarily chosen point of the electrode tool, along a conical surface whose apex point is at $Z_1$ (FIG. 2), until the amount of eccentricity, or radius of the orbiting motion path reaches again the value $R_0$. When this occurs, the motor 20 is again activated as previously explained, and the cycle is repeated. Consequently, as illustrated at FIG. 2, machining is effected by way of consecutive forward feeding cycles of the electrode tool 1 within the workpiece 2 simultaneously with a circular or orbiting motion of the electrode tool at a radius which progressively increases and which is cyclically repeated. The envelope of the limit of the orbiting radii is a cylinder $E_0$ concentric to the electrode main axis of longitudinal feed W.

Such a process for EDM machining presents many advantages, especially for sinking relatively deep recesses. More particularly, the simultaneous combination of electrode tool longitudinal feed and orbiting feed provides a resultant oblique or angular feed relative to the electrode tool axis, with the result that machining is effected simultaneously on the bottom and on the sidewall of the cavity in the workpiece. In the event of arcing or short circuit, the electrode tool is retracted along the same angular path, such that the surface of the electrode tool moves away not only from the bottom of the cavity but also from its sidewall, which results in rapidly extinguishing any arcing that may have occurred between the lateral surface of the electrode tool and the sidewall of the cavity in the workpiece. In addition, the combined linear and orbiting motion of the electrode tool improves considerably the rate of flow of dielectric fluid through the machining zone as compared to the fluid flow rate when the electrode tool is simply fed longitudinally into the workpiece.

FIG. 2 also illustrates in dash lines another parameter of electrode tool feed which is achieved when the switch $S_1$ of FIG. 1 is closed. Under those conditions, the comparator 32 receives a signal from the position detector 21. It will be appreciated that by changing the slope angle of the cam 23, or even by reversing the cam angle, the slope of the envelope E of the consecutive final machining points represented by $R_1', R_2' \ldots R_5'$ is correspondingly changed. This arrangement, by appropriately setting the slope angle of the cam 23, therefore permits to obtain at will cavities which are progressively widening or narrowing as a function of the feed of the electrode tool within the workpiece. In the event that it is desired to obtain a progressive widening of the cavity as a function of the longitudinal feed of the electrode tool, the electrode tool must be designed with a tip of a diameter larger than the diameter of its body.

FIG. 3 represents a diagram illustrating the operation of the apparatus of FIG. 1 set in such manner that consecutive machining passes are effected with the same amount of longitudinal feed of the electrode tool within the workpiece, but in the course of which the radius of the circular orbital path is progressively increased. In order to achieve EDM machining under such conditions and with such results, the switch $S_1$ of FIG. 1 is closed, the double-pole switch $S_2$ is connected to the output of the bistable multivibrator 58, the double-pole switch $S_3$ is connected to the input of the AND gate 60, and the switch $S_4$ is open. Under those conditions, when the orbital path has reached its preset limit, the signal at the output of the AND gate 55 causes the bistable multivibrator 58 to provide a binary "1" at its output Q. The binary "1" signal, through the switch $S_3$ and the AND gate 60, is applied to the terminal b of the motor 20 which drives the jackscrew 19 in a direction that displaces the slide 18 upwardly. A pulse generator 62 is coupled to the motor 20 and supplies a pulse at its output each time the motor 20 has revolved a value providing a predetermined displacement of the slide 18, for example each time the slide 18 has been displaced a fraction of a millimeter. A pulse provided at the output of the pulse generator 62 is applied through the OR gate 57 to the input $C_p$ of the bistable multivibrator 58, resulting in a binary "0" appearing at the output Q of the multivibrator, which in turn commands the motor 20 to stop.

Each incremental upward motion of the slide 18 results in increasing the amount of eccentricity of the orbiting mechanism 13, which in turn causes a decrease of the machining gap width and therefore a command signal from the monitoring circuit 28 through the comparator 25, the amplifier 27, the comparator 29 and the amplifier 30 to activate the servo control 5 to retract the electrode tool 1 an appropriate amount counteracting the increase in eccentricity. Therefore, each time the orbiting path reaches the limit perimeters illustrated at $T_1$, $T_2$, $T_3$ . . . at FIG. 3, the servo control causes a retraction of the electrode tool without a corresponding decrease of the orbiting radius being effected, such that machining continues according to consecutive orbiting circles of step by step increasing radius, because the signal at the output of the position detector 34 is modified by the signal at the output of the detector 21.

Figure 4:
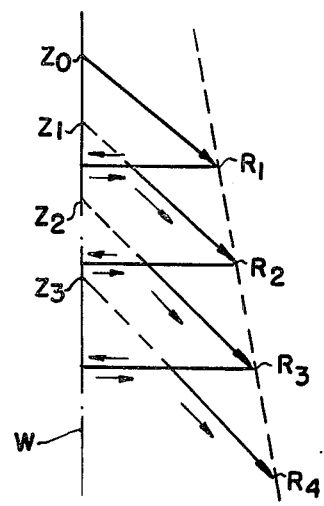

FIG. 4 illustrates graphically another parameter of machining condition achieved by the present invention, whereby machining is effected angularly, or obliquely, in several consecutive phases or passes, an intermediary pass during which the orbiting path has a zero radius being interposed between consecutive machining passes. Those conditions of operation are achieved by closing the switch $S_1$, throwing the switch $S_2$ to the terminal connected to the output Q of the monostable multivibrator 59, connecting the switch $S_3$ to the terminal a of the motor 20 and closing the switch $S_4$.

Under this set-up, at the beginning of the machining sequence the slide 18 is positioned at its uppermost position engaging the detent 64 of the limit switch 61 such that the limit switch is open and provides a binary "0" applied to the corresponding input of the AND gate 60 after the first machining pass. At the end of the first machining pass the orbiting radius has reached a value $R_1$ (FIG. 4), and the slide 18 is advanced downwardly to a position providing a 0 radius orbiting circle, the amount of travel of the slide 18 being obtained by presetting the time interval during which the monostable multivibrator 59 is in its unstable state. As soon as the slide 18 no longer engages the detent 64 of the limit switch 61, the limit switch 61 closes and a binary "1" is applied to the input of the AND gate 60, such that when the monostable multivibrator 59 returns to its stable state the signal appearing at its output $\overline{Q}$ is applied to the terminal b of the motor 20, causing the slide 18 to travel upwardly until it again turns the limit switch 61 off.

As the limit switch 61 is frictionally affixed to the support bracket 18a, and the housing of the limit switch is provided with a bent over arm 63 having a finger 63a engageable with the bottom surface of the slide 18, the distance between the bent over finger 63a and the switch activating detent 64 being wider than the thickness of the slide 18, when the slide 18 is downwardly displaced, the limit switch 61 is also displaced downwardly, however of a distance much smaller than the distance of displacement of the slide 18. Consequently, the upward travel of the slide 18 is limited in distance until it engages the detent 64 of the limit switch 61, at which time the slide occupies the position $Z_1$ (FIG. 4). The next machining cycle is effected until the orbiting circle reaches a radius $R_2$ which is longer than $R_1$, because the signal from the detector 34 is corrected by the signal from the detector 21, and consecutive machining cycles are repeated until the preset depth of machining is reached.

Figure 5:
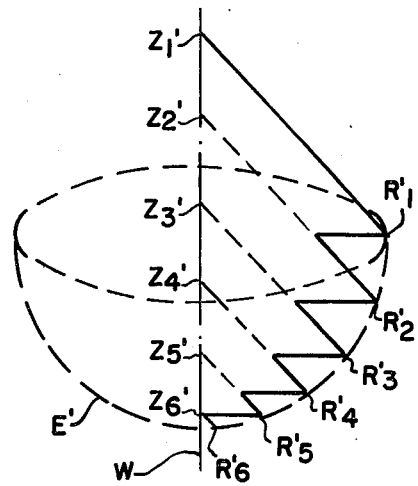

FIG. 5 illustrates a further mode of operation of the invention, wherein the extreme limits of displacement of a given point of the surface of the electrode tool are enveloped by an hemispherical surface. In order to achieve such a mode of operation, the switch $S_1$ is closed, the switch $S_2$ is connected to the output Q of the monostable multivibrator 59, the switch $S_3$ is placed in a position connecting the switch $S_2$ to the terminal a of the motor 20, and the switch $S_4$ is open. The switches are therefore in the same position that they occupy to accomplish the result diagrametically illustrated at FIG. 2 to achieve the out-of-center radii $R_1'$, $R_2'$ . . . disposed at the envelope E'. The rectilinear cam plate 23 is replaced by a cam of a profile corresponding to the spherical envelope desired. Such an envelope of the electrode tool displacement in the longitudinal direction and along an orbiting path is of great interest because it permits to achieve with optimum precision the machining of a cavity of any desired shape.

Many modifications of the herein disclosed system are within the purview of the present invention. For example, a rotating cam may be used to replace the cam plate 23 cooperating with the detector 21, the rotatable cam being driven, through any appropriate gear ratio, from the motor 20, and the detector 21 providing a signal on the line 36. Also, the end of the rod 15 may be provided with a screw thread for driving in rotation by means of the motor 20 through a cup-like driving wheel having an internal screw thread corresponding to the screw thread on the end of the rod 15.

It will be appreciated that the relative translation motion of the electrode tool and electrode workpiece relative to each other is referred to throughout the specification and the appended claims as an orbiting or orbital motion, although such movement of translation is not, in all cases, a truly and geometrically orbiting motion along a curvilinear path. The expression "orbiting" or "orbital" motion has been selected for the sake of simplification, and because it has apparently acquired significance in the art by analogy with other methods and apparatus for removing material from a workpiece, such as orbital sanders and grinders wherein the tool is transversely oscillated or translated during feed of the tool towards and into the workpiece, whether such motion of translation or oscillation of the tool is effected along a linear path, a curvilinear path, a square path, or a rectangular path.

Having thus described the present invention by way of an example of practical embodiment of an apparatus for accomplishing the process of the invention, modifications whereof will be apparent to those skilled in the art.

What is claimed as new is as follows:

1. In an EDM process for machining an electrode workpiece by means of an electrode tool whereby the electrodes are displaced one relative to the other along a longitudinal feed axis of relative advance while simultaneously relatively orbiting the electrodes in a plane perpendicular to the feed axis such as to accomplish a three-dimensional relative motion between the electrodes and wherein the amplitude of said displacement is controlled such as to maintain predetermined machining conditions within the machining zone between the electrodes, the improvement comprising accomplishing the machining of a surface on the workpiece in a plurality of consecutive machining passes during each of which the path of the orbiting motion is on an envelope surface of predetermined shape until a predetermined limit of orbiting path is reached, axially displacing said surface when said limit is reached, and causing the machined surface to be different from the envelope surface of all the limits of the orbiting paths.

2. The improvement of claim 1 wherein the orbiting motion is effected along a path whose envelope surface is a surface of revolution having an apex situated on the principal axis of longitudinal advance of said electrode tool, the useful portion of said surface being at an angle relative to said principal axis, and wherein the apex of each of said surfaces is linearly displaced along a principal axis at the end of each machining pass when the amplitude of the orbiting motion in the workpiece reaches a predetermined limit value.

3. The improvement of claim 2 wherein the apex is displaced along said principal axis by predetermined increments for each consecutive pass.

4. The improvement of claim 3 wherein said apex is displaced by one of said increments of displacement when said predetermined limit value is reached during at least one complete cycle of orbiting.

5. The improvement of claim 4 wherein said increments are equal.

6. The improvement of claim 4 wherein the limit value of the amplitude of orbiting motion is held constant from one machining pass to the other.

7. The improvement of claim 4 wherein said limit value of the amplitude of orbiting motion from one machining pass to the other is varied as a predetermined function of the displacement of the apex of the surface of revolution.

8. The improvement of claim 7 wherein the limit values of the amplitudes of orbiting motions during each maching pass are enveloped by an hemispherical surface.

9. The improvement of claim 4 wherein said limit value of the amplitude of orbiting motion is varied proportionally to the displacement of the apex of the surface of revolution, said surface of revolution being in the form of a cone having a generetrix forming a predetermined angle with said principal axis.

10. The improvement of claim 7 wherein said limit value of the amplitude of orbiting motion is varied proportionally to the displacement of the apex of the surface of revolution, said surface of revolution being in the form of a cone having a generatrix forming a predetermined angle with said principal axis.

11. The improvement of claim 4 wherein said apex of the surface of revolution is displaced from a predetermined initial position of a distance substantially equal to the longitudinal feed of the electrode tool relative to the workpiece up to a limit value of the amplitude of the orbiting motion and wherein said apex is subsequently displaced in an opposite direction up to a new initial position.

12. The improvement of claim 4 wherein the limit values of the amplitudes of orbiting motions during each machining pass are enveloped by an hemispherical surface.

13. The improvement of claim 3 wherein said increments are equal.

14. The improvement of claim 1 wherein the orbiting motion is effected along a path whose envelope surface is a surface of revolution having an apex situated on the principal axis of longitudinal advance of said electrode tool, the useful portion of said surface being at an angle relative to said principal axis, and wherein the apex of each of said surfaces is linearly displaced along a principal axis at the end of each machining pass when the amplitude of the longitudinal penetration of the electrode tool in the workpiece reaches a predetermined limit value.

15. The improvement of claim 14 wherein the apex is displaced along said principal axis by predetermined increments for each consecutive pass.

16. The improvement of claim 15 wherein said apex is displaced by one of said increments of displacement when said predetermined limit value is reached during at least one complete cycle of orbiting.

17. The improvement of claim 16 wherein said increments are equal.

18. The improvement of claim 15 wherein said increments are equal.

19. The improvement of claim 1 wherein the orbiting motion is effected along a path whose envelope surface is a surface of revolution having an apex situated on the principal axis of longitudinal advance of said electrode tool, the useful portion of said surface being at an angle relative to said principal axis, and wherein the apex of each of said surfaces is linearly displaced along a principal axis at the end of each machining pass when the amplitudes of the orbiting motion and of the longitudinal penetration of the electrode tool in the workpiece each reach a predetermined limit value.

20. The improvement of claim 19 wherein the apex is displaced along said principal axis by predetermined increments for each consecutive pass.

21. The improvement of claim 20 wherein said apex is displaced by one of said increments of displacement when said predetermined limit value is reached during at least one complete cycle of orbiting.

22. The improvement of claim 21 wherein said increments are equal.

23. The improvement of claim 4 wherein said increments are equal.

24. An apparatus for EDM machining an electrode workpiece by means of an electrode tool whereby the electrodes are displaced one relative to the other along a longitudinal feed axis of relative advance while simultaneously relatively orbiting the electrodes in a plane perpendicular to the feed axis such as to accomplish a three-dimensional relative motion between the electrodes and wherein the amplitude of said displacement is controlled such as to maintain predetermined machining conditions within the machining zone between the electrodes, said apparatus comprising means for displacing the electrode tool and the electrode workpiece relative to each other along a pair of axes disposed in a plane substantially perpendicular to the axis of penetration of the electrode tool within the electrode workpiece, means for superimposing upon the motion in said plane a relative motion of said electrodes towards each other and away from each other along the axis of penetration of said electrode tool within said electrode workpiece from a predetermined initial longitudinal position of the electrode tool relative to the electrode workpiece, means for controlling said relative motions such as to maintain predetermined machining conditions within the machining zone between said electrodes, means for measuring the amplitude of motion in said plane, means cooperating with said controlling means and said measuring means for preventing the amplitude of motion in said plane from exceeding a predetermined limit value, means for gradually displacing the relative initial longitudinal position of said electrodes from which the relative motions in said plane are initiated with a progressively increasing amplitude, means for providing a command signal as soon as said limit value of said amplitude is reached, and means for controlling the motion of said relative longitudinal position as a function of said command signal.

25. The apparatus of claim 24 wherein means are provided for giving said command signal the form of an electrical pulse of predetermined duration, and wherein means are provided for displacing said relative longitudinal position during the duration of said signal.

26. The apparatus of claim 24 wherein said relative longitudinal position is controlled as a function of the position of a slide element driven by an electric motor, and comprising means for establishing an electrical signal having an amplitude varying as a function of the position of said slide element and means for correcting said limit value of the amplitude of said motion in said plane as a function of said electrical signal amplitude.

27. The apparatus of claim 24 further comprising means for displacing said relative longitudinal position from an initial predetermined position in a predetermined direction during the duration of said command signal, and means for displacing said relative longitudinal position in an opposite direction to a new initial position in the absence of said command signal.

* * * * *

UNITED STATES PATENT AND TRADEMARK OFFICE
CERTIFICATE OF CORRECTION

PATENT NO. : 4,135,070

DATED : January 16, 1979

INVENTOR(S) : Jean Pfau et al

It is certified that error appears in the above-identified patent and that said Letters Patent are hereby corrected as shown below:

Col. 2, line 30, after "workpiece" insert --2 by means of electrical discharges supplied from a DC source--

Col. 4, line 48, change "Q" to --$\bar{Q}$--.

Signed and Sealed this

First Day of May 1979

[SEAL]

Attest:

RUTH C. MASON
*Attesting Officer*

DONALD W. BANNER
*Commissioner of Patents and Trademarks*